Nov. 4, 1969       K. LUFT       3,476,934
INFRA-RED GAS ANALYZER FOR MEASURING THE CONCENTRATION
OF A PARTICULAR GAS
Filed July 27, 1967

INVENTOR
KARL LUFT
BY
Jennings Bailey Jr
ATTORNEY

United States Patent Office 3,476,934
Patented Nov. 4, 1969

3,476,934
INFRA-RED GAS ANALYZER FOR MEASURING THE CONCENTRATION OF A PARTICULAR GAS
Karl Luft, Essen, Germany, assignor to Office National d'Etudes et de Recherches Aerospatiales, Chatillon-sous-Bagneux, France
Filed July 27, 1967, Ser. No. 656,515
Claims priority, application France, July 27, 1966, 71,102
Int. Cl. G01n 21/26
U.S. Cl. 250—43.5                    6 Claims

ABSTRACT OF THE DISCLOSURE

A gas analysing apparatus for measuring the concentration of a particular gas in a mixture of gases, in which infra-red radiation is passed successively through a sample cell containing the mixture to be analysed and through two detector chambers arranged one after the other. One of the detector chambers communicates with one side of a variable plate of a variable capacitor, and the other detector chamber communicates with the other side of this same plate. The signal at zero concentration of the particular gas is compensated by an auxiliary signal produced independently of the signal at zero.

---

The invention relates to an analysing apparatus operating by means of modulated infra-red radiation, for measuring, in a mixture of substances, in particular gases, the concentration of a particular substance, in particular, the concentration of a particular gas. The infra-red radiation is first passed through the said mixture, and then into two detector chambers disposed one after the other in the path of the rays, these two detector chambers being separaed one from the other by one or more windows permeable to the rays, but impermeable to the gases. In this apparatus, the first detector chamber absorbs principally the rays contained in this infra-red radiation having wave lengths which correspond to the centres of the absorption lines and bands of the substance to be determined, in particular of the gas to be determined, whereas the second detector chamber absorbs the wave lengths corresponding to the absorption lines and bands of the substance to be determined which still remain to be absorbed, in particular the wave lengths corresponding to the marginal parts of the said absorption lines and bands.

To this end, the detector chambers contain either the substance to be determined in the mixture or a substance whose absorption lines and bands correspond substantially to those of the substance to be determined. In particular, concerning the rear detector chamber, if the substance contained in this chamber is not the same as the substance to be determined, it is sufficient that the substance contained in this chamber is absorbent for the wave lengths which correspond to the marginal parts of the absorption lines and bands of the substance to be determined. Nevertheless, in general, the two detector chambers disposed one after the other contain the same substance, namely the substance to be determined in the mixture.

The absorption of the radiation emergies produces, in each of the detector chambers, pressures whose difference is a function of the concentration of the substance to be determined in the mixture. To measure this difference of the pressures, the pressures produced in one of the detector chambers act on one of the faces of the diaphragm of a diaphragm type capacitor, this diaphragm being common to the two detector chambers, and the pressures produced in the other detector chamber act on the opposite face of this diaphragm. A variation of the pressure difference modifies the shape of the diaphragm, and consequently, the characteristics of the capacitor.

Needless to say, at the zero point of the measurement, hence when the concentration of the substance to be determined in the mixture is equal to zero, the radiation energies absorbed in the two detector chambers should be in equilibrium. To obtain this equilibrium, an attempt has been made to provide the known analysing apparatuses of the type in question with absorbent layers whose lengths or initial pressures—or again whose partial pressures in the case where the gas chosen as the absorbent substance is mixed with a neutral gas—have values such that the desired result is assured. In general, the length or the pressure of the layer contained in the second chamber is greater than that of the layer contained in the first chamber.

It has been found rather difficult, in many cases, to arrange the amplitude and the phase of the signals emanating from the two chambers, so that their values are exactly equal at the zero point of the measurement, that is to say when the concentration of the gas to be determined in the gas mixture in the analysing chamber is equal to zero, so that the signals reciprocally cancel each other at this point. Generally, on the contrary, a signal called hereafter "difference signal" or "signal at zero" is obtained at the zero point of the measurement. When the detector chambers have unequal lengths, the difference signal, or signal at zero, is a function of the geometrical difference of the two chambers. But even if the detector chambers have the same lengths, since the pressures of the gases which they contain are different, it is not easy to achieve the compensation of the amplitude and phase of the signals at zero coming from the two chambers, because the processes of absorption in the two chambers, and consequently, the time constants of the heating and cooling created by periodic irradiation, are different.

It is known to obtain the compensation of the signals at zero emitted by the detector chambers with the aid of auxiliary devices, such as regulable diaphragms, regulable pneumatic deviations or buffer volumes, these auxiliary devices acting on the amplitude and the phase of the signals coming from the chambers. However, these devices lead to considerable additional costs and their handling is complicated and difficult.

To avoid the production of strong signals in the chambers, and consequently, the production of an unwanted difference signal, it has already been proposed to divide the radiation into two parts approximately equal and modulated in phase opposition, to divide moreover an analysing chamber into a measuring compartment and a comparison compartment, and to pass one of the partial radiations through the measuring compartment and the other partial radiation through the comparison compartment, and to arrange the two detector chambers downstream of this analysis chamber. Nevertheless, such an arrangement complicates the optical device, and in addition, by reason of the division of the radiation into two portions, leads to a less effective use of this radiation.

The object of the present invention is to eliminate the difficulties mentioned above, in a simple manner which facilitates the practical application of the apparatus in question.

The invention resides essentially in compensating the difference signal or signal at zero, which signal is of alternating magnitude and is due to the inequality of the signals emitted by the detector chambers, with the aid of means adapted to produce, independently of the difference signal obtained by the above mentioned diaphragm type capacitor, an auxiliary signal which serves to compensate the difference signal which appears in the capacitor at the zero point of the measurement of the concentration of the gas to be determined.

The invention can be carried out in a particularly simple manner if an emitter modulated by means of electric impulses is used as the radiation emitter, and not an emitter modulated mechanically by means of a rotary obturator; for, in the case of an electric modulator, the modulator which controls the emitter for the measuring radiation can also serve to produce the auxiliary signal.

The auxiliary signal can be introduced anywhere in the measuring chain traversed by the signals, this chain comprising the radiation detector device and the amplifier.

It is particularly advantageous to introduce the auxiliary signal, in the form of a modulated radiation, into the detector device, and hence as near as possible to the beginning of the measuring chain, so that the difference signal and the auxiliary signal are subject, insofar as is possible, to the same influences whereby the signal at zero produced by the difference of the two signals remains constant. To this end, the measuring chamber whose signal, at the zero point of the measurement, is not sufficient to compensate the signal emitted by the other measuring chamber, is exposed to an auxiliary radiation produced by a second source of modulated radiation. Advantageously, it is arranged that the detector chamber which is exposed to the auxiliary radiation is the second detector chamber. In this case, the rear wall of the said second chamber is formed as a window permeable to rays, and a second source of modulated radiation is disposed at this window. In this way, the symmetry of the optical device is maintained.

In many cases, and in particular, if the sensitivity of the measurement does not need to be very high, the second source of modulated radiation can be dispensed with, and the auxiliary signal can be produced in the form of an alternating voltage electric signal controlled by the modulator device of the source of the radiation for the measurement, this auxiliary signal being then superimposed on the difference signal at an appropriate place in the amplifier.

In every case it has been found particularly advantageous, by reason in particular of the harmonic waves of the frequency of modulation which are always present in the difference signal, to give the auxiliary signal a magnitude identical and a direction opposite to that of the component of the difference signal which is parallel to the predominant signal of the two signals emitted by the detector chambers at the zero of the measurement. In general, it is the signal coming from the forward detector chamber which is predominant. Furthermore, the component of the difference signal oriented perpendicular to the above mentioned component is eliminated by means of a rectification, as a function of the phase, of the total resultant signal of the difference signal and auxiliary signal.

However, if the disturbing factors such as temperature and variations in voltage or in frequency act in a different way on the difference signal and the auxiliary signal, the device serving to produce the auxiliary voltage can advantageously be provided with correction elements working as a function of the said disturbing factors.

It should furthermore be noted here that it is already known to compensate electrically the unwanted signals in an apparatus in which each detector chamber has its own diaphragm type capacitor. Such a possibility of compensation evidently does not exist in an apparatus where the two detector chambers have only one capacitor having a common diaphragm. However, it is evident that an apparatus which comprises only a single diaphragm type capacitor is considerably simpler and less costly than an apparatus having two diaphragm type capacitors which are the most costly elements of the installation.

The accompanying drawings show two different embodiments of the invention.

Figure 1:
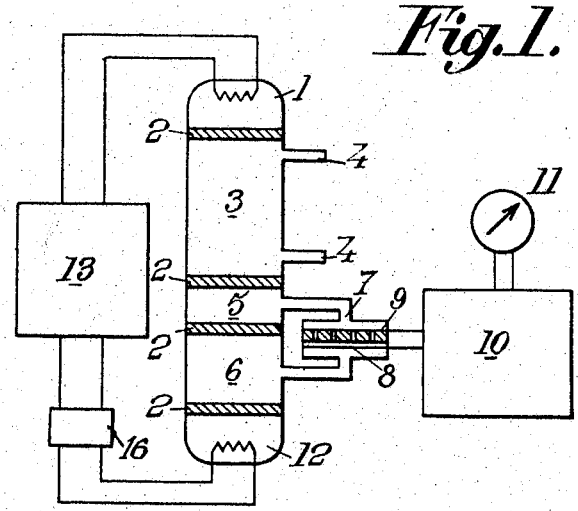
FIGURES 1 and 2 show schematically one and the other of these two embodiments respectively.

The figures show the application of the invention to an apparatus for analysing a mixture of gas, of the type described in the applicant's United States Patent No. 2,951,939 granted on Sept. 6, 1960.

The optical part of the analysing apparatus is constituted by a radiation emitter 1 modulated periodically, by an analysis chamber 3 comprising conduits 4 for the inlet and the outlet of the gas mixture to be analysed, and by two detector chambers 5 and 6 disposed one after the other in the path of the rays. The emitter, the analysis chamber and the detector chambers are separated from each other by windows 2 permeable to the rays but impermeable to the gases. In the embodiments shown in the figures, the two detector chambers 5 and 6 are filled with gas at the same pressure so that these chambers can be connected to two compartments of a common diaphragm type capacitor 7, this capacitor comprising a flexible diaphragm 8 and a counter-plate 9. In the embodiments represented in FIGURES 1 and 2, the gas filling the detector chambers can be the gas to be determined in the mixture of gas to be analysed.

In the first detector chamber 5 are absorbed principally the wave lengths corresponding to the centres of the absorption lines and bands of the gas to be determined, whereas in the detector chamber 6, which is located downstream of the first detector chamber, are absorbed principally the wave lengths which correspond to the marginal parts of these absorption lines and bands. The height of the first detector chamber 5 is less than that of the second detector chamber 6. The heights of the detector chambers 5 and 6 are chosen so that in the case where the gas mixture in the analysis chamber 3 is completely devoid of the gas to be determined, the concentration of this latter gas thus being equal to zero, the pressure increases produced by the absorption of the radiation in the two detector chambers 5 and 6 have, insofar as is possible, the same amplitude and phase so that they compensate each other at the diaphragm of the capacitor. In practice, however, since this goal can never be completely reached, a certain difference signal is produced at the zero point of the measurement whose compensation is the object of the present invention. On the other hand, if the gas mixture in the analysis chamber contains a certain quantity of the gas to be determined, differences of pressure are produced in the detector chambers 5 and 6, these pressure differences being modulated periodically at the frequency corresponding to the periodic modulation of the radiation emitted by the emitter 1, the magnitude of these differences indicating the concentration of the gas which is to be determined in the gas mixture to be analysed.

The periodic modulations of the differences of pressure produce variations in the capacitance of the diaphragm capacitor 7. In the amplifier 10 connected to this capacitor, these variations are transformed into voltage variations which are amplified. After their rectification, they are indicated by the measuring instrument 11.

The periodic modulation of the radiation emitted by the emitter 1 can be obtained with the aid of mechanical means such as rotary obturators or their analogues. It is however more advantageous to produce the modulation of the radiation by electric means by supplying an emitter having a small thermal inertia with current impulses at a low frequency. By using as the source of radiation a band of chromium-nickel having a thickness of $15\mu$, this band being extended in the air, a sufficient modulation amplitude can be obtained for impulse frequencies of 5 cycles per second.

Figure 2:
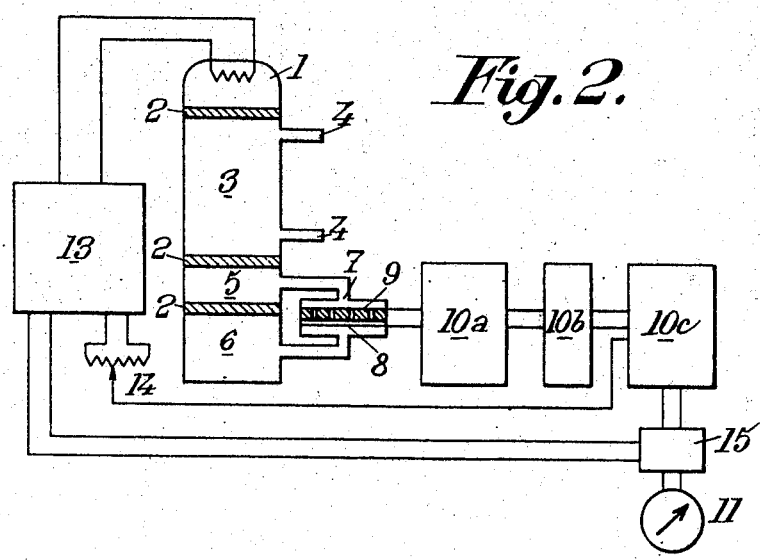

In the analysing apparatuses illustrated in FIGURES 1 and 2, the radiation emitter 1 is constituted as has just been described, the current impulses serving for its supply being produced, in a known manner, by an impulse generator 13 comprising a multi-vibrator (Eccles-Jordan control circuit) to which an amplifier is connected.

To compensate the difference signal produced at the zero point of the measurement and resulting from the geometric differences of the two detector chambers 5 and 6, an auxiliary radiation emitter is provided, according to the embodiment of the invention represented in FIGURE 1, this auxiliary radiation emitter serving to produce an auxiliary signal intended to compensate the difference signal, the auxiliary radiation thus produced passing into the one of the two detector chambers which, at the zero point of the measurement, emits the weaker signal. Preferably, the apparatus is arranged so that this weaker signal is produced, at the zero of the measurement, by the rear detector chamber 6, the auxiliary radiation being consequently directed towards this rear chamber 6. According to FIGURE 1, an auxiliary radiation emitter 12 is disposed behind the detector chamber 6, the rear wall of the detector chamber 6 being constituted by a window permeable to the rays. This arrangement of the auxiliary emitter 12 behind the rear wall of the rear detector chamber 6 is particularly advantageous due to the fact that it safeguards the symmetry of the radiation.

The modulation of the radiation emitted by the auxiliary emitter 12 is equal to that of the radiation emitted by the principal emitter 1. Advantageously, the modulation of the radiation from the auxiliary emitter is also produced electrically. This permits the impulses supplying the auxiliary emitter 12 to be produced in the modulator 13 by using the same control circuit, the said modulator nevertheless comprising known supplementary devices 16 which regulate the amplitude and phase of the auxiliary radiation in a manner such that the difference signal produced in the detector chambers by the principal emitter 1 is compensated, as much as possible, by the auxiliary signal which is produced by the auxiliary radiation. To this end, the auxiliary signal is not only given the same amplitude as that of the difference signal, but also a phase dephased by 180° with respect to the phase of the difference signal.

Figure 3:
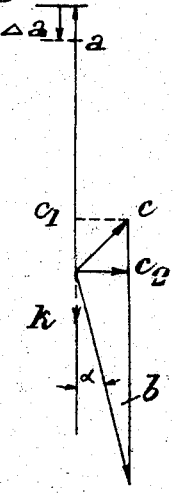
FIGURE 3 is a diagram illustrating the object of FIGURE 2.

According to the embodiment of the invention represented in FIGURE 2, the compensation of the difference signal is obtained solely by electric means. To facilitate the understanding, the signals concerned have been illustrated by the vector diagram of FIGURE 3. The signals emitted by the detector chambers 5 and 6 which are represented by vectors $a$ and $b$ give rise to the difference signal $c$. FIGURE 3 shows the signals at the zero point of the measurement, that is to say in the case where the analysis chamber 3 is devoid of the gas to be determined.

According to FIGURE 3, it has been supposed that the signal $b$ emitted by the rear chamber 6 is only equal to ⅘ of the signal $a$ emitted by the forward detector chamber 5, the angle between the phases of the two signals being $\alpha$.

To permit the regulation of the auxiliary signal, the difference signal $c$ appearing at the zero point of the measurement is rotated after the preamplifier 10$a$ in the dephaser 10$b$ so that its component $c_1$ located in the direction of the signal emitted by the detector chamber 5 is dephased by 180° exactly with respect to the auxiliary voltage $k$ provided by the modulator 13. In the principal amplifier 10$c$, the auxiliary signal is superposed on the difference signal; this signal is regulated with the aid of the potentiometer 14, so that $c_1$ is compensated by $k$ ($c_1-k=0$).

A rectifier 15 operating as a function of the phase supplies the amplifier 10$c$, due to the compensation of the component $c_1$ of the difference signal by the auxiliary signal $k$, with an alternating output voltage which consists only in the component $c_2$ oriented perpendicular to the signal $a$ emitted by the chamber 5. The control of the rectifier is accomplished by means of the modulator, in synchronism with the auxiliary voltage $k$, and the component $c_2$ perpendicular to the control phase is not rectified, and consequently it is rendered ineffective for the measurement.

By contrast, if the analysis chamber 3 contains any concentration whatsoever of the gas to be determined, the absorption of the radiation by this gas acts in practice only on the signal emitted by the forward chamber 5. The decrease of this signal is represented in the vector diagram of FIGURE 3 by $\Delta a$. Although at the zero point of the measurement $c_1-k$ is equal to 0, there is now obtained at the output of the rectifier 15, as will be easily understood by considering the vector diagram, a continuous voltage corresponding to the value of $\Delta a$. This voltage indicates the amount of absorption effected in the analysis chamber 3 by the gas to be determined and consequently the concentration of the said gas in the chamber.

The compensation mentioned above of $c_1$ by $k$ followed by the rectification as a function of phase is particularly advantageous also by reason of the harmonic waves of the modulation frequency which are always present in the difference signal.

Needless to say, the invention is not limited to the embodiments described above. Evidently the means described with the aid of FIGURES 2 and 3 consisting in the compensation of $c_1$ by $k$ followed by a rectification as a function of phase can also be applied to the embodiment illustrated in FIGURE 1 by providing, for example, the amplifier 10 with the appropriate means for this end.

It is also possible to use as the emitter an emitter which operates purely electronically, such as laser diodes.

What I claim is:

1. Apparatus for measuring the concentration of a particular subsance in a mixture of substances comprising:
    a sample cell arranged to be filled with a sample of said mixture,
    a detector unit comprising a first and a second detector chamber,
    an emitter for passing modulated infra-red radiation succesively through said sample cell, said first detector chamber and said second detector chamber whereby pressures are produced in said first and second detector chambers by radiation absorption in said chambers, the difference between said pressures being a function of the concentration of said particular substance in the mixture,
    a variable capacitor having one plate flexibly movable with respect to the other plate, said variable capacitor being arranged so that pressures in said first detector chamber act on one side of said one, flexibly movable plate, and pressures in said second detector chamber act on the other side of said one, flexibly movable plate, whereby the position of said one, flexibly movable plate with respect to said other plate is a function of the pressure difference between the pressure in said first detector chamber and the pressure in said second detector chamber, said variable capacitor being electrically connected to produce a difference signal which is characteristic of said pressure difference,
    and means for producing, independently of said difference signal produced by said variable capacitor, an auxiliary signal adapted to compensate, with respect both to amplitude and to phase, the difference signal produced by said variable capacitor at the zero point corresponding to a zero concentration of said particular substance in said mixture.

2. Apparatus according to claim 1 in which one of said two detector chambers produces a pressure signal weaker than the pressure signal produced by the other detector chamber at said zero point, said auxiliary signal being produced by an auxiliary emitter for passing modulated infra-red radiation into said one detector chamber at a frequency equal to the frequency of the first mentioned radiation coming from said first mentioned emitter, but out of phase with respect to said first mentioned radiation.

3. Apparatus according to claim 2 in which said one detector chamber is the second detector chamber and is provided with a window permeable to infra-red radiations on the opposite side of said second detector chamber from said first mentioned emitter, said auxiliary emitter being disposed outside said second detector chamber and arranged to send said auxiliary radiation through said window into said second detector chamber.

4. Apparatus according to claim 2 comprising an electric modulator common to both the first mentioned emitter and the auxiliary emitter, for modulating both the first mentioned radiation and the auxiliary radiation at the same time.

5. Apparatus according to claim 1 comprising an amplifier electrically connected to said variable capacitor for amplifying said difference signal produced at said variable capacitor, said auxiliary signal being an electric signal and being superimposed on said difference signal in said amplifier.

6. Apparatus according to claim 1 in which said auxiliary signal has the same amplitude as the component of said difference signal which is parallel to the signal emitted by said first detector chamber, the direction of said auxiliary signal being opposite to the direction of said component, rectifier means being provided for rectifying the signal which is the resultant of said difference and auxiliary signals as a function of phase, whereby the component of said difference signal which is perpendicular to said previously mentioned component is eliminated.

References Cited
UNITED STATES PATENTS

| | | | |
|---|---|---|---|
| 2,924,713 | 2/1960 | Liston | 250—43.5 |
| 2,951,939 | 9/1960 | Luft | 250—43.5 |
| 3,105,147 | 9/1963 | Weilbach et al. | 250—43.5 |

RALPH G. NILSON, Primary Examiner

S. C. SHEAR, Assistant Examiner